June 20, 1967

T. P. ALLEN 3,327,208

ELECTRICAL DEVICE FOR INDICATING THE RATE
OF AN OCCURRENCE OF AN EVENT

Filed June 24, 1964

INVENTOR.
Thomas P. Allen
BY
Hugh L. Fischer
ATTORNEY

# United States Patent Office 3,327,208
Patented June 20, 1967

3,327,208
ELECTRICAL DEVICE FOR INDICATING THE RATE OF AN OCCURRENCE OF AN EVENT
Thomas P. Allen, Flint, Mich., assignor to General Motors Corporation, Detroit, Mich., a corporation of Delaware
Filed June 24, 1964, Ser. No. 377,669
2 Claims. (Cl. 324—70)

This invention relates to electrical measuring apparatus for providing an indication of the rate of occurrence of an event and, more particularly, to such apparatus as may be particularly useful as a speedometer or tachometer.

Various types of electrical devices which are essentially frequency meters have been proposed for use as tachometers or speedometers. Basic to these devices is the presentation of an indication of the rate of occurrence of a particular event. The present invention provides means by which the rate of occurrence of an event, such as the revolution of a wheel, crank shaft, distributor rotor or any other recurring event, may be indicated by the angular displacement from a reference position of a rotatable element such as an armature. In general, this is accomplished by the combination of sender means responsive to the recurring event for producing a train of voltage pulses, the frequency of which is related to the rate of occurrence of the event. The combination further includes receiving apparatus in the form of a meter means connected to receive the pulse train and to produce a number of magnetic field components, the resultant of which is angularly displaced in accordance with the frequency of the pulse train.

A particular embodiment of the present invention is described in the following specification which is to be taken with the accompanying drawings of which:

Figure 1:
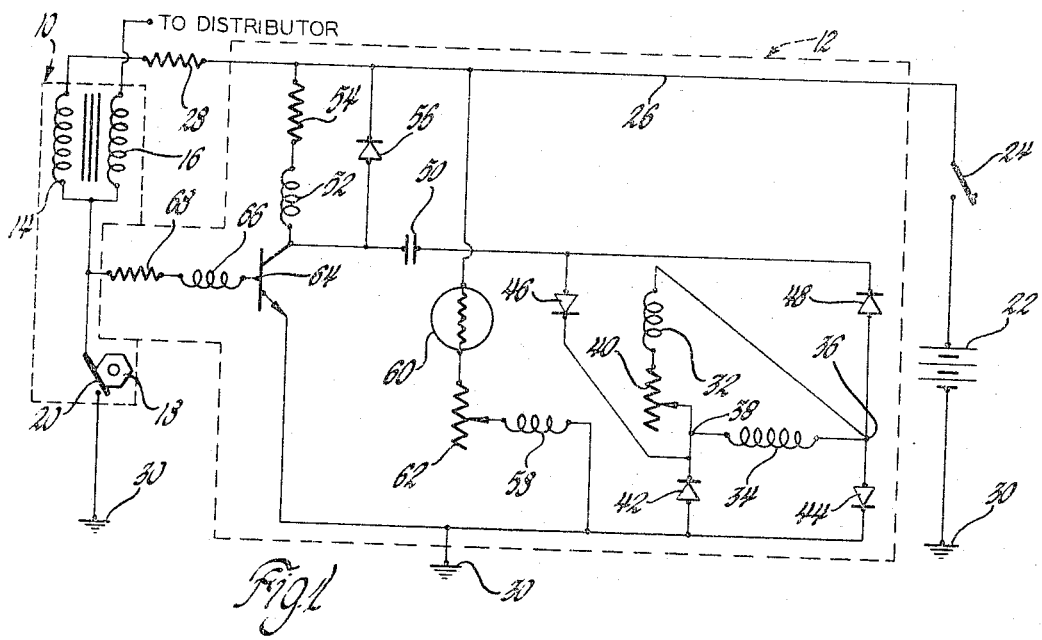
FIGURE 1 is a schematic diagram of a tachometer circuit for monitoring the speed of an internal combustion engine having a spark discharge distributor system.

Briefly describing the specific embodiment of the invention which is detailed herein, the apparatus as shown in the drawings and further described herein produces a plurality of magnetic field components, the resultant of which is rotatable through a predetermined angle from a reference position in accordance with variations in the frequency of signals from a sender means which represent the speed of rotation of an internal combustion engine, particularly as indicated by the ignition distributor rotor. Two of the field components are produced by first and second coils having magnetic axes which intersect at a predetermined angle and which are connected to a source of electrical energy through the combination of rectifier means, capacitor means and switch means. The capacitor means is responsive to the source to receive charging currents therefrom when the switch means is in one condition. The switch means is responsive to the signals from the sender means to be periodically switched to the other condition for periodically discharging the capacitor means, thus, causing discharging current through the capacitor. The rectifier means is operative to direct the charging and discharging currents of the capacitor means unidirectionally through the coils such that the magnitude of the fields produced thereby varies with the frequency of the operation of the switch means. To accomplish the desired angular displacement of the resultant of the magnetic field components, additional means are provided for producing a substantially constant magnitude magnetic field along an axis which is aligned with one of the axes of the two coils. The last-mentioned magnetic field is disposed so as to be in opposition to one of the first magnetic fields. According to this scheme, when no current is received by the two coils, the resultant magnetic field is aligned with the last-mentioned means for producing the third magnetic field. However, as the switch means is operated with increasing frequency, the currents through the two coils increase, thus rotating the resultant magnetic field away from the direction of the substantially constant field. To provide a visual indication of the angular displacement of the resultant field, an armature in the form of a permanent magnet may be rotatably supported in such a position that it is under the joint influence of the magnetic field components. The armature will thus be aligned with the resultant magnetic field. A needle may be attached to the armature so as to be rotatable therewith to point in a direction which is related to the direction of the resultant magnetic field and may be associated with properly calibrated dial means to convey information to the observer. It should be noted that the term "magnetic field" is used generically herein to include fields produced by both permanent magnets and electromagnetic coils.

Referring now particularly to FIGURE 1, the circuit is shown to include sender means generally indicated at 10 and meter means generally indicated at 12. The sender means 10 is effective to produce signals which vary in frequency in accordance with the speed of operation of an internal combustion engine, not shown. The meter means 12 is connected to receive these signals and to produce a plurality of magnetic field components, the resultant of which is angularly displaced in accordance with the frequency of the signals from the sender means 10. The specific embodiment shown in the drawings incorporates, as the sender means 10, a portion of the spark distribution system for the internal combustion engine including ignition step-up transformer coils 14 and 16 and a distributor rotor 18 which is operatively associated with a breaker switch 20 such that the switch 20 is closed and opened at a rate proportional to the speed of rotation of the rotor 18. As shown, switch 20 is connected in a circuit which further includes a DC source 22 which may be the automobile battery, an ignition switch 24, a conductor 26, a current limiting resistor 28 and ignition coil 14. The circuit is completed through the ground connections 30 as indicated.

The meter means 12 is shown to include a pair of electromagnetic coils 32 and 34 for producing respective magnetic fields along axes which intersect at an angle of substantially 90° as shown. Coils 32 and 34 are effectively connected in parallel in that both coils are connected on one side to a circuit junction 36 and on the other side to a circuit junction 38. Coil 32 is connected to the junction 38 through a rheostat arrangement 40 which allows for adjustment or balancing of currents through the coils 32 and 34. To provide unidirectional current flow through the coils 32 and 34, full wave rectifier means are provided including a first pair of diodes 42 and 44. Diode 42 has the cathode thereof connected to junction 38 and the anode connected to ground 30 while diode 44 is connected to conduct in the opposite direction with the anode connected to junction 36 and the cathode connected to ground 30. The rectifier means includes a second pair of diodes 46 and 48 which are also connected to conduct in opposite directions; that is, diode 46 has the cathode thereof connected to junction 38 while diode 48 has the anode connected to junction 36. The anode of diode 46 and the cathode of diode 48 are commonly connected to one terminal of a capacitor 50. The other terminal of capacitor 50 is connected to the positive terminal of source 22 through the series combination of an inductor 52, a current limiting resistor 54, conductor 26 and ignition switch 24. A diode 56 is connected across the series combination of inductor 52 and resistor 54 to clamp the capacitor 50 to the potential of the source 22.

A third coil 58 is effectively connected across the source 22 by means of a temperature compensating thermistor 60 and an adjustable rheostat arrangement 62. Coil 58 thus produces a magnetic field component which is of substantially constant magnitude, assuming only minor variations in the output of source 22. It should be noted that the magnetic axis of coil 58 corresponds with the magnetic axis of coil 34. In addition, it will be seen that the magnetic field produced by coil 58 opposes the field produced by coil 34.

The meter means 12 further includes a switch for periodically discharging capacitor 50. The switch includes a transistor 64 having the collector electrode connected to the positive terminal of source 22 through the series combination of inductor 52, resistor 54, conductor 26 and ignition switch 24. The base electrode of transistor 64 is connected to the sender means through the series combination of an inductor 66 and a resistor 68. The emitter electrode of transistor 64 is connected to ground 30 as shown. With switch 20 in the open position, as shown in FIGURE 1, the base electrode of transistor 64 is at a high potential, thus rendering transistor 64 conductive across the collector to emitter circuit. However, when switch 20 is closed by the distributor rotor 18, the base of transistor 64 is grounded and the transistor is nonconductive.

When ignition switch 24 is closed to complete the supply circuit and distributor switch 20 closed to render transistor 64 nonconductive, a charging path for capacitor 50 is provided through the circuit including conductor 26, resistor 54, inductor 52, capacitor 50, diode 46, the parallel combination of coils 32 and 34, and diode 44 to ground 30. Charging current thus produces a magnetic field from coil 32 in the north direction as shown in the drawing and a magnetic field in the east direction from coil 34 as shown in the drawing. Upon opening switch 20, transistor 64 conducts to provide a discharge path through the circuit including diode 42, the parallel combination of coils 32 and 34, diode 48, capacitor 50, the collector-emitter circuit of transistor 64 to ground 30. This discharge current also produces a north-directed field from coil 32 and an east-directed field from coil 34. Thus, the rectifier bridge including diodes 42, 44, 46 and 48 assures unidirectional current through the coils 32 and 34 upon either charging or discharging of capacitor 50. It can further be seen that the magnitude of the fields produced by the coils 32 and 34 increases with the frequency of operation of the combination of switch 20 and distributor rotor 18. The field produced by coil 58, however, is substantially constant and opposing the field produced by coil 34.

Figure 2:
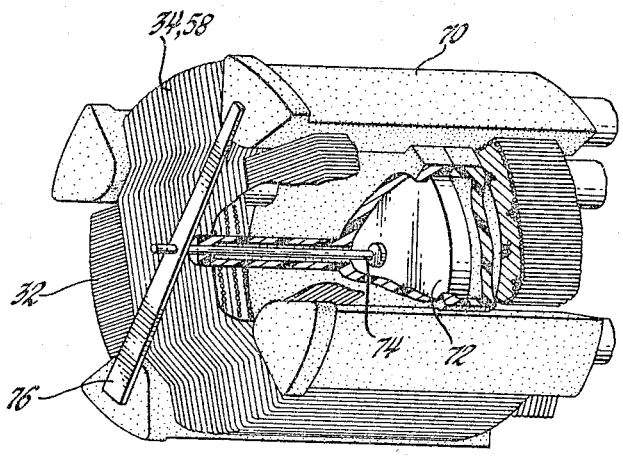
FIGURE 2 is a three-quarter view, partly in cross-section, of a unit employing the circuit of FIGURE 1 and which may be conveniently mounted on an instrument panel.

Looking now to FIGURE 2, the unit there illustrated includes a support means in the form of a bobbin 70 of nonconductive material such as plastic. The bobbin 70 is adapted to accommodate the coils 32, 34 and 58 and a permanent magnet armature 72 in the form of a flat round disc which is diametrically magnetized such that the poles are diametrically opposite one another. Coils 34 and 58 are wound bifilar in one plane on the bobbin 70 so as to have a common magnetic axis along which respective fields are produced in opposite directions. Coil 32 is wound on bobbin 70 such that the magnetic axis thereof intersects the magnetic axis of coils 34 and 58 at an angle of 90° at the common center of the coils. The armature 72 is secured to the bobbin 70 by means of a shaft 74 which protrudes from the left-hand side of the coils as shown in the drawings. Supported on the shaft 74 is an indicator needle 76 which is rotatable with the armature 72 to indicate the direction of the resultant of the magnetic fields produced by coils 32, 34 and 58.

Figure 3:
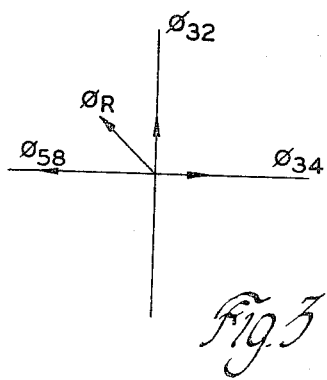
FIGURE 3 is a flux vector diagram for the electromagnetic field configuration produced by the circuit of FIGURE 1.

Describing the operation of the tachometer shown in FIGURES 1 and 2, reference should be had to the flux vector diagram of FIGURE 3. Upon closure of ignition switch 24, coil 58 is connected across source 22. Coil 58 thus produces a relatively large magnetic field component designated in FIGURE 3 as $\phi_{58}$ which extends in the westward direction as shown. The magnitude of this flux field remains substantially constant throughout the operation of the circuit. As the engine including the distributor rotor 58 begins to rotate, capacitor 50 is alternately charged and discharged at a rate corresponding with the rate of rotation of distributor rotor 18. This charging and discharging of capacitors 50 produces, through the charging and discharging circuits outlined above, current in coils 32 and 34 which varies in accordance with the rate of operation of the circuit breaker means including transistor 64. Coil 32 thus produces a magnetic field designated by $\phi_{32}$ in the north direction as shown in FIGURE 3. Coil 34 produces a magnetic field designated by $\phi_{34}$ in the east direction as shown in FIGURE 3. The magnitude of both fields $\phi_{32}$ and $\phi_{34}$ increases with increasing speed of rotation of distributor rotor 18.

The direction of the resultant vector of the magnetic fields $\phi_{32}$, $\phi_{34}$ and $\phi_{58}$ is determined by simple vector addition as also indicated in FIGURE 3. As the rate of engine rotation, and, accordingly, the rate of rotation of distributor rotor 18, increases, the resultant vector $\phi_R$ is rotated in a clockwise direction from an initial position corresponding with the direction of field $\phi_{58}$. Due to the opposing nature of fields $\phi_{34}$ and $\phi_{58}$ it can further be seen that as the speed increases to the point where $\phi_{34}$ equals $\phi_{58}$ the resultant flux field is aligned with the direction of field $\phi_{32}$. The permanent magnet armature 72, being jointly influenced by the magnetic field components aligns with the resultant flux vector. Further, as engine speed increases, the resultant flux vector rotates increasingly clockwise with the magnetic armature 72 and needle 76 following.

While the above description of the present invention has been directed toward a specific embodiment thereof in the form of a tachometer, it will be obvious to those skilled in the art that this invention may be readily adapted to other uses including speedometer and frequency measuring applications. Therefore, the description is not to be construed as limiting the invention to a particular application or to the specific structure set forth above inasmuch as various additions and modifications will be apparent to those skilled in the art. For a definition to the invention reference should be had to the appended claims.

What is claimed is:

1. Electrical measuring apparatus including a source of unidirectional electrical energy, non-magnetic support means, first and second parallel connected coils for producing first and second magnetic fields and being concentrically disposed on the support means with the axes thereof intersecting at right angles, a capacitor connected to the source to receive charging current therefrom, a transistor switch connected to the capacitor and operable over a predetermined frequency range for periodically discharging the capacitor, sender means for producing a train of voltage pulses related in frequency to the rate of occurrence of an event and being operatively connected to the transistor switch to vary the conductivity thereof, a full wave rectifier bridge operatively connecting the capacitor to the parallel combination of the first and second coils to direct charging and discharging current unidirectionally through the coils whereby the magnitudes of the first and second fields vary in the same sense with the frequency of operation of the transistor switch, a third coil connected across the source for producing a third magnetic field of substantially constant magnitude, the third coil being disposed on the support means concentric with the first and second coils and coaxial with the first coil such that the third field opposes the first field, and a permanent magnet armature rotatably mounted on the support means at the intersection of the magnetic field axes and responsive to the magnetic fields to be aligned with the resultant thereof.

2. Apparatus for monitoring the speed of rotation of an internal combustion engine having a spark discharge distributor system, the apparatus including a source of unidirectional electrical energy, non-magnetic support means, first and second parallel connected coils for producing first and second magnetic fields and being concentrically disposed on the support means with the axes thereof intersecting at right angles, a capacitor having one terminal connected to the source to receive charging current therefrom, switch means for periodically discharging the capacitor and including a transistor having an input and two output electrodes, one output electrode being connected to the capacitor and another output electrode being connected to ground, means operatively connecting the input electrode with the distributor system for controlling the conductivity of the transistor at a frequency related to the speed of the engine, a first pair of diodes connecting the other terminal of the capacitor to opposite sides of the parallel connected first and second coils, a second pair of diodes connecting opposite sides of the first and second coils to ground, both of the first and second pairs of diodes being conductive in opposite directions thereby to direct charging and discharging current of the capacitor unidirectionally through the first and second coils whereby the magnitudes of the first and second fields vary with the frequency of operation of the transistor, a third coil connected across the source for producing a third magnetic field of substantially constant magnitude, the third coil being disposed on the support means concentric with the first and second coils and coaxial with the first coil such that the third field opposes the first field, and a permanent magnet armature rotatably mounted on the support means at the intersection of the magnetic field axes and responsive to the magnetic fields to be aligned with the resultant thereof.

References Cited
UNITED STATES PATENTS

| | | | |
|---|---|---|---|
| 2,181,960 | 12/1939 | Bacon | 324—140 |
| 2,839,725 | 6/1958 | Haas | 324—70 |
| 2,849,679 | 8/1958 | Barlett | 324—146 |
| 3,202,910 | 8/1965 | Fathauer | 324—70 |

WALTER L. CARLSON, *Primary Examiner.*

RUDOLPH V. ROLINEC, *Examiner.*

M. J. LYNCH, *Assistant Examiner.*